(12) United States Patent
Sherman

(10) Patent No.: US 6,505,737 B1
(45) Date of Patent: Jan. 14, 2003

(54) PACKAGING FOR RECORDABLE MEDIA

(75) Inventor: Michael T. Sherman, Stanley, NC (US)

(73) Assignee: Dalton Marketing LLC, Naples, FL (US)

( * ) Notice: Subject to any disclaimer, the term of this patent is extended or adjusted under 35 U.S.C. 154(b) by 0 days.

(21) Appl. No.: 09/723,738

(22) Filed: Nov. 28, 2000

(51) Int. Cl.⁷ .............................................. B65D 85/30
(52) U.S. Cl. .................................. 206/308.1; 206/312
(58) Field of Search ............................. 206/308.1, 309, 206/310–313; 40/124.15

(56) References Cited

U.S. PATENT DOCUMENTS

| | | |
|---|---|---|
| 1,347,269 A | 7/1920 | Greble |
| 2,125,424 A | 8/1938 | Cloud |
| 2,142,826 A | 1/1939 | Rosello |
| 2,311,218 A | 2/1943 | Fandrich |
| 2,449,911 A | 9/1948 | Roth |
| 2,472,166 A | 6/1949 | Mathewson |
| 2,530,950 A | 9/1950 | Ebert |
| 2,720,046 A | 10/1955 | Decker |
| 2,920,409 A | 1/1960 | Sampson |
| 2,954,119 A | 9/1960 | Goldsholl |
| 2,975,905 A | 3/1961 | Foland |
| 3,029,051 A | 4/1962 | Nichols |
| 3,057,470 A | 10/1962 | Heiber |
| 3,226,863 A | 1/1966 | Southard |
| 3,549,225 A | * 12/1970 | Scaccia .................. 206/308.1 |
| 3,763,583 A | 10/1973 | Gregg |
| 4,582,286 A | 4/1986 | Mancuso |
| 5,101,973 A | 4/1992 | Martinez |
| 5,154,284 A | 10/1992 | Starkey |
| 5,248,032 A | 9/1993 | Sheu |
| 5,253,751 A | 10/1993 | Wipper |
| 5,259,133 A | 11/1993 | Bursch |
| 5,287,641 A | 2/1994 | Showers |
| 5,479,732 A | 1/1996 | Burtch et al. |
| 5,608,977 A | 3/1997 | Burtch et al. |
| 5,613,311 A | 3/1997 | Burtch |
| 5,641,063 A | 6/1997 | Gambardella et al. |
| 5,711,101 A | 1/1998 | Mueller |
| 5,732,491 A | 3/1998 | Burtch |
| 5,740,957 A | 4/1998 | Wenkman |
| 5,746,689 A | 5/1998 | Murphy |
| 5,901,843 A | 5/1999 | Gambardella et al. |
| 5,901,844 A | 5/1999 | Gambardella et al. |
| 6,059,101 A | 5/2000 | Gambardella et al. |

FOREIGN PATENT DOCUMENTS

| | | |
|---|---|---|
| GB | 162551 | 5/1921 |
| GB | 881755 | 11/1961 |

* cited by examiner

*Primary Examiner*—Shian Luong
(74) *Attorney, Agent, or Firm*—Betty A. Ryberg; Kaye Scholer LLP

(57) ABSTRACT

A packaging system for CDs, DVDs, software disks and the like is provided which includes a base, an upright body having a pocket for receiving and holding CDs, DVDs, software disks and the like, and an elongate member connected to the base. The base and upright body are constructed and communicate with each other such that the packaging system has a collapsed position which it is in when it is shipped or stored, and a display position. The elongate member has a construction such that it is capable of enfolding the base thereby providing additional protection during shipping and added space for advertising or printing thereon. The elongate portion may include a spine hingedly connected between panels for displaying information when the packaging system is placed on retail shelves or stored. The upright body may also include a pocket with an edge that has upper and lower openings and opposing ends which terminate in small holes for allowing easy insertion of a CD, DVD, software disks or the like. The upper opening may have a shape which generally conforms to the portion of the CD, DVD, software disks or the like held therein, and a lower opening that has a shape which is generally nonlinear. The packaging system may also include a pouch for holding software manuals and other bulky items. The packaging system is made from a unitary blank.

28 Claims, 11 Drawing Sheets

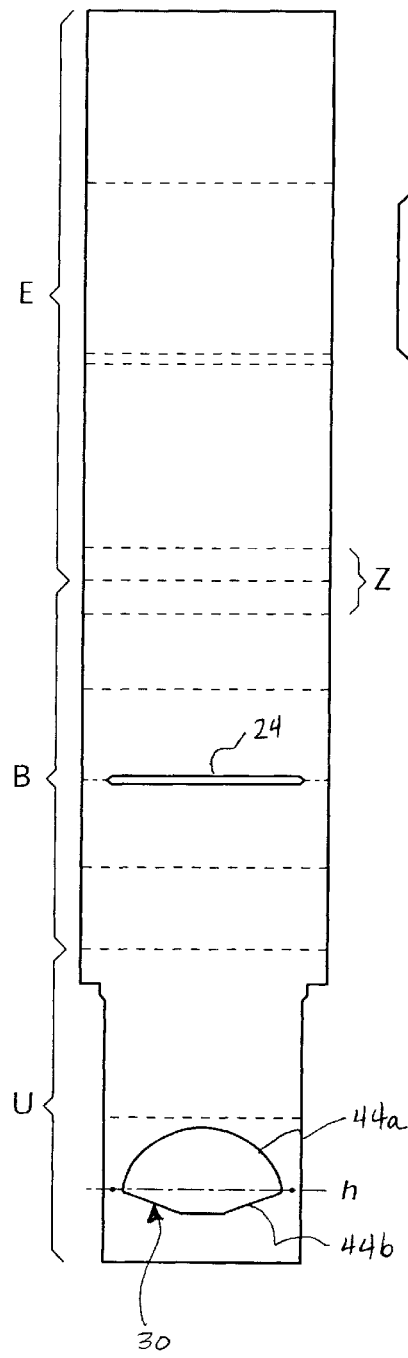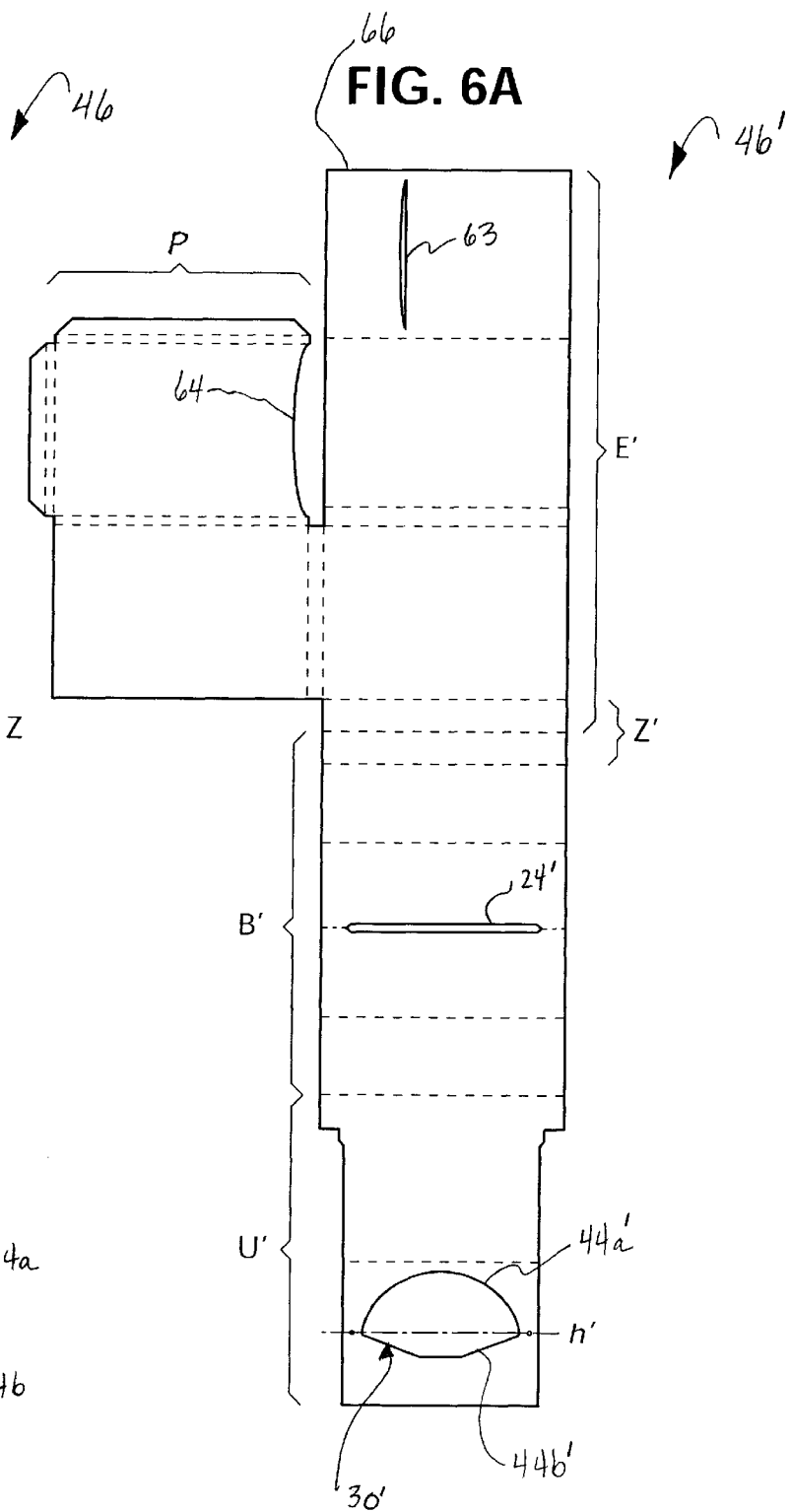

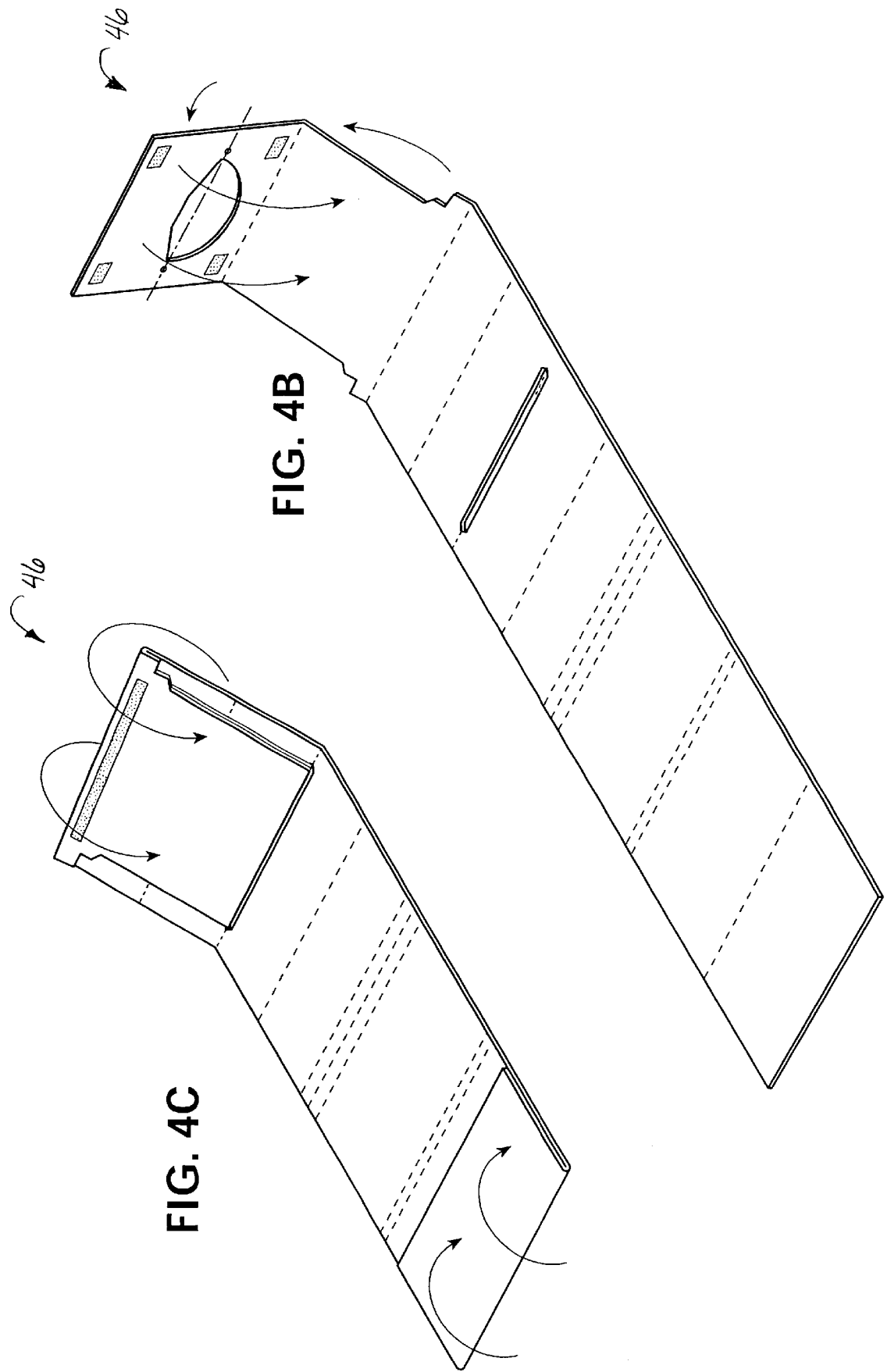

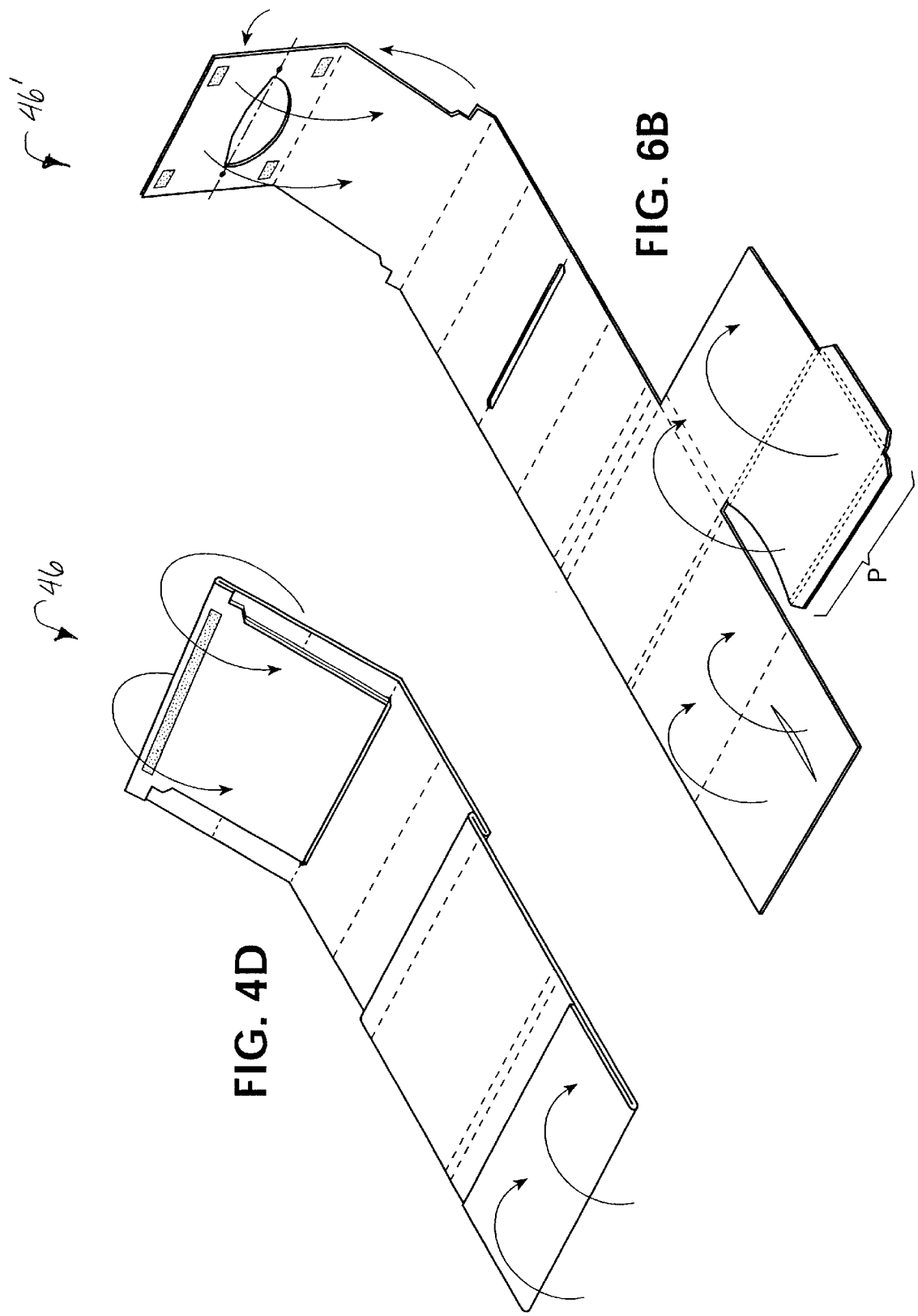

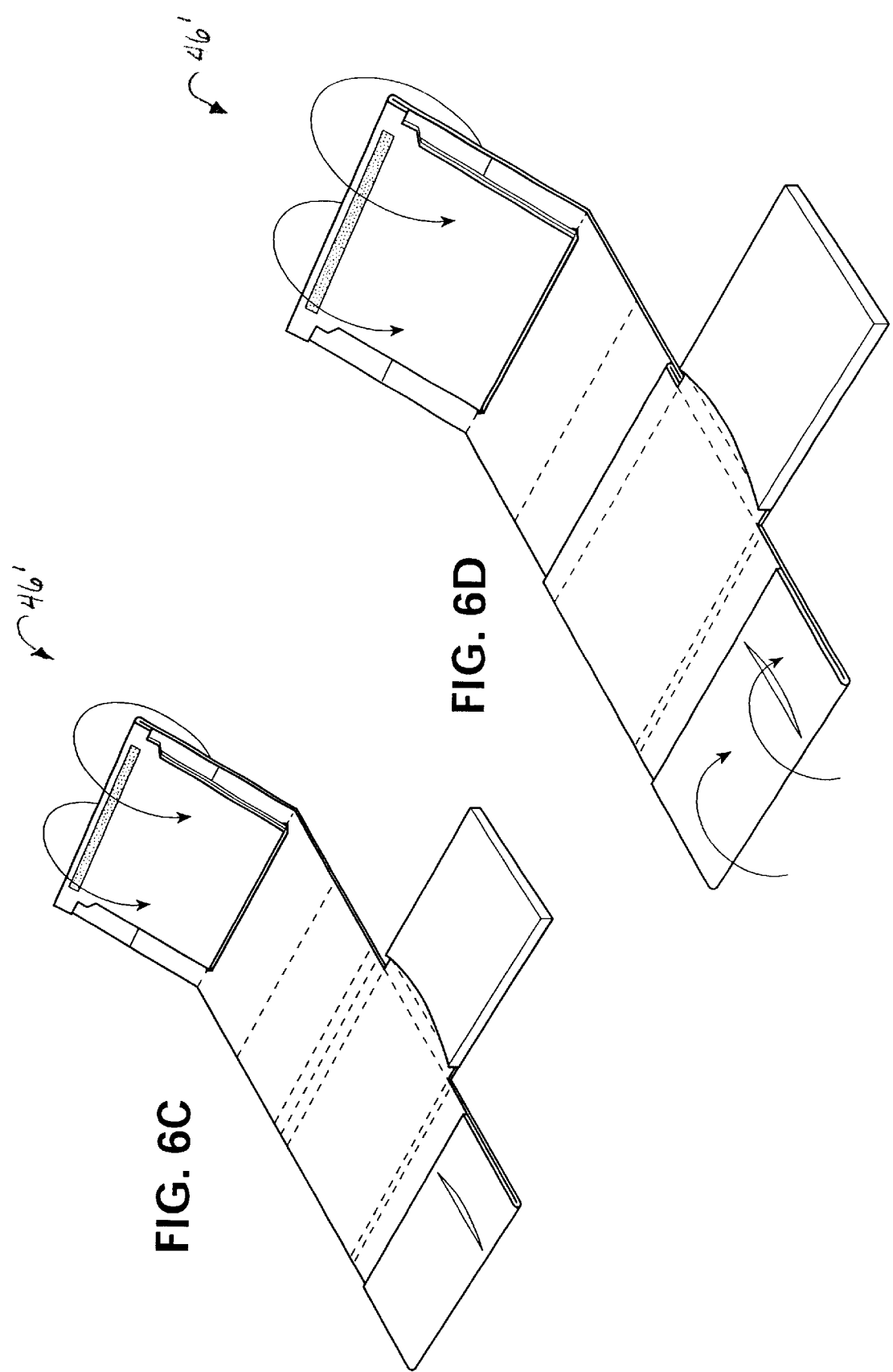

FIG. 9 FIG. 10
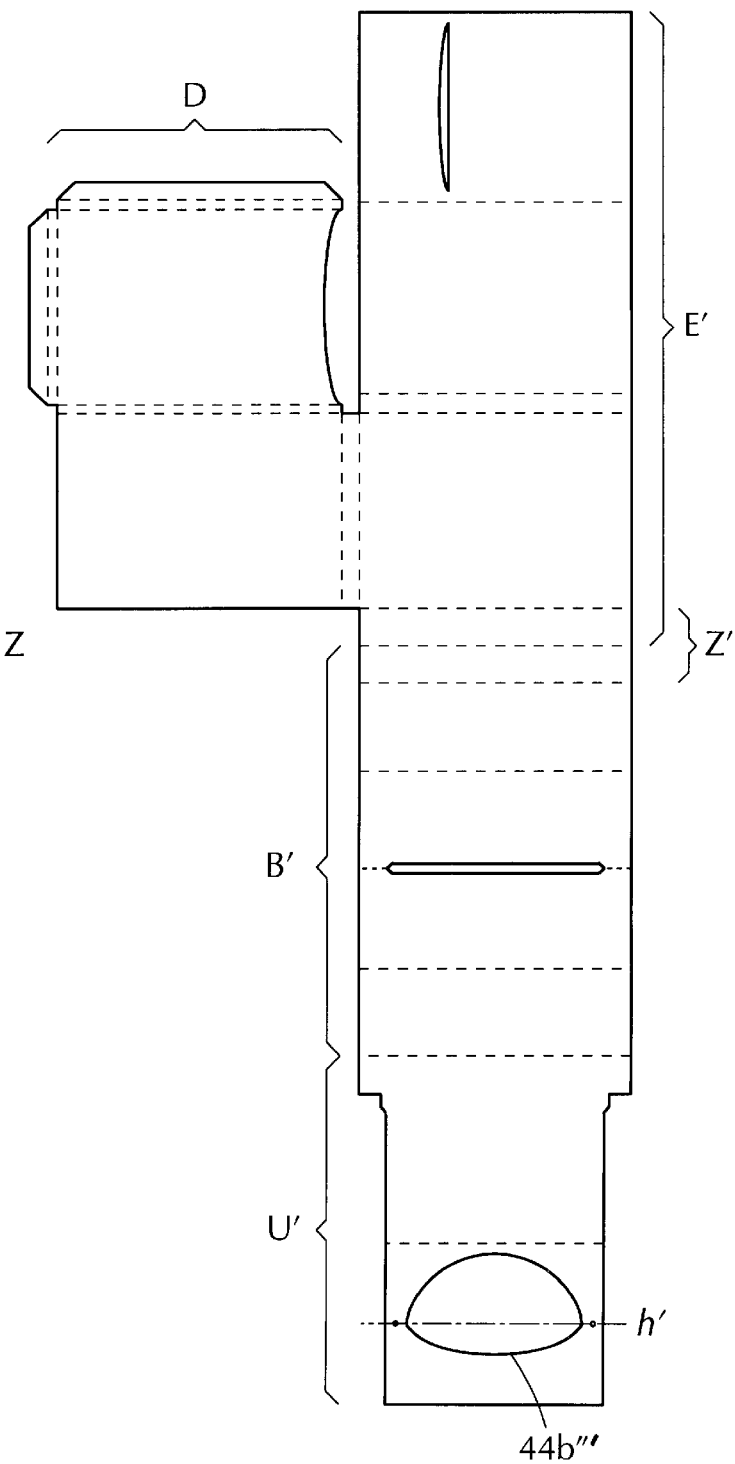

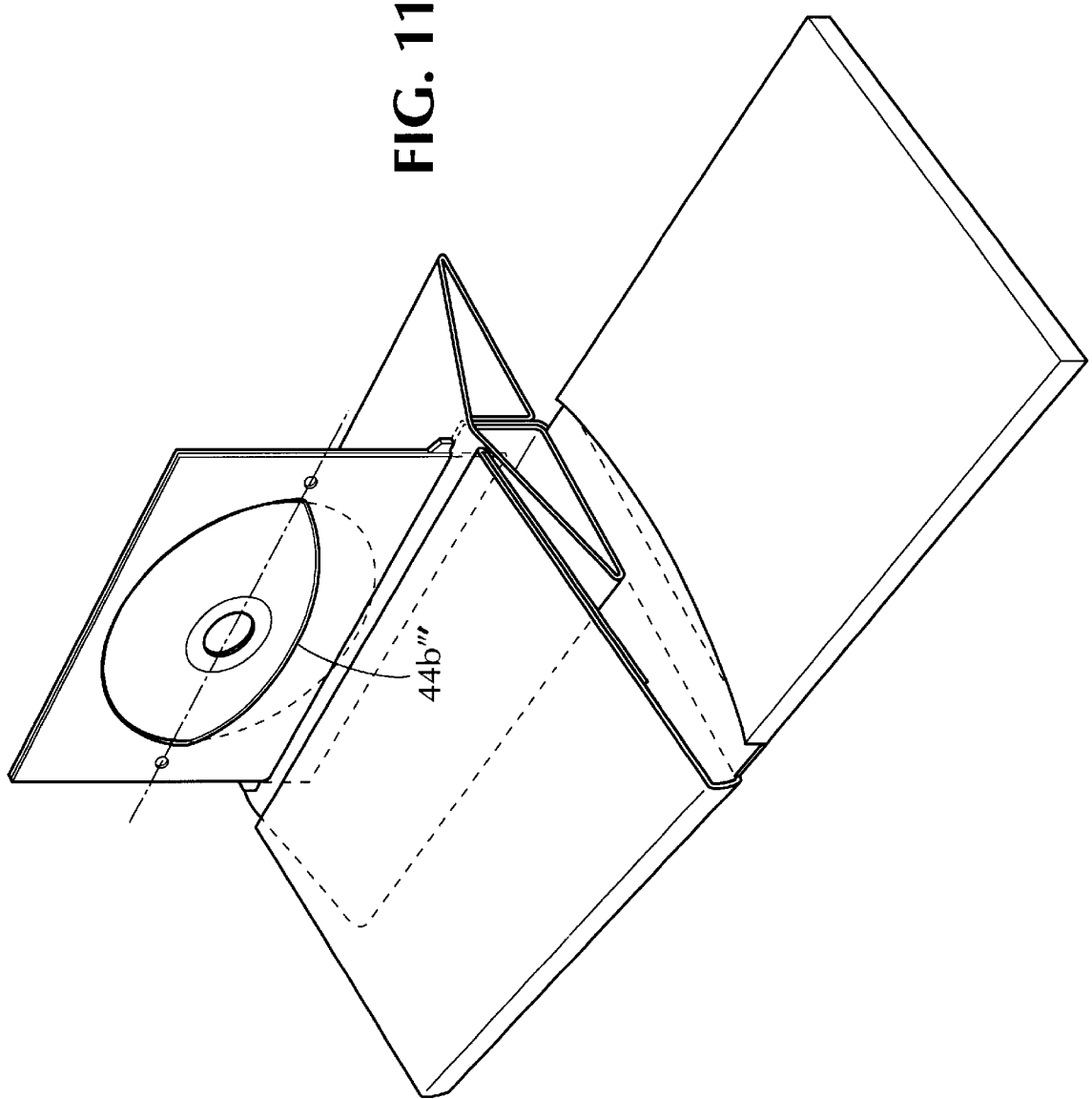

PACKAGING FOR RECORDABLE MEDIA

TECHNICAL FIELD

The invention relates to packaging for displaying, storing and shipping recordable media items, including CDs, DVDs, software and the like.

BACKGROUND

CDs are typically packaged in jewel cases. Jewel cases are usually made of rigid plastic. A jewel case typically has a spine which allows information concerning the CD contained inside it to be displayed when the case and its contents are stored, or displayed on retail shelves. Ordinarily, multiple CDs are shipped in their jewel cases in a larger shipping box which protects the jewel cases during shipping. Jewel cases are often much larger and heavier (i.e., bulkier) than the CDs held within them. In addition, jewel cases tend to cost more than they should because they tend to be oversized. Disadvantages of jewel cases are that they take up significantly more retail shelf space than necessary, use of a shipping box is preferred to minimize breakage during shipping, and they tend to cost more to ship than they should because they are bulkier than they need to be.

DVDs are ordinarily packaged in cases typically made out of vinyl or other relatively soft plastic and/or paperboard cases. Like jewel cases, DVD cases are ordinarily much larger and heavier (i.e., bulkier) than the DVDs held within them. Thus, disadvantages of DVD cases, like jewel cases, is that they take up significantly more retail shelf space than necessary, and they tend to cost more to ship than they should because they are bulkier than necessary.

Software is ordinarily packaged in flat sleeves. Accompanying software manuals are typically packaged with the sleeves in a larger, outer box with added packaging materials. Software boxes containing the sleeve and manual are preferably shipped in larger shipping boxes to avoid damage. Disadvantages of software boxes, as with jewel and DVD cases, is that they typically take up significantly more retail shelf space than necessary, and tend to be costly to ship.

Display packaging is available which can be used to display one or more CDs, DVDs, software disks and the like. One type of such display packaging is described in U.S. Pat. Nos. 5,641,063, 5,613,311 and 5,608,977 (the "'063," "'311," and "'977" patents, respectively). Such packaging is usually constructed from heavyweight paper. Prior art packaging tends to be smaller and lighter than jewel and DVD cases, and software boxes. In addition, since such packaging is typically constructed of heavyweight paper, it tends to be unbreakable, unlike jewel cases.

Prior art display packaging is typically constructed with a pocket for inserting the CD, DVD, software disk or the like which has an edge, the upper portion of which is generally linear, be it generally horizontal or slanted or angled, or generally linear with a notch in the center thereof. The lower portion of the edge, which forms the bottom of the pocket, is generally in the shape of a sector of a circle so as to conform to the shape of the bottom portion of the CD, DVD, or software disk placed therein. The lower portion tends to hold the CD, DVD or software disk placed therein from its bottom. The lower portion can also have embossments to further aid in holding the CD, DVD or software disk placed therein from its bottom. Typically the CD, DVD, or software disk is not held from its top. The pocket typically does not open very wide or is difficult to open very wide, and tends not to allow for easy or automatic insertion of CDs, DVDs, software disks and/or the like.

In addition, prior art display packaging typically does not have a spine. "Spine," as used herein, means a generally flat area having a height that is significantly smaller than its width, yet which has a height sufficient to display information thereon.

Such display packaging also does not typically have an elongate member such that it can enfold the package, provide added advertising space for retail display advertising, and provide added protection during shipping. Moreover, display packaging tends to be capable of holding and displaying CDs, DVDs, software disks and the like, but not bulkier items, such as software manuals, due to space and construction limitations.

Thus, disadvantages of prior art display packaging include that, when stored or displayed in retail shelf space, information concerning the content of the packaging cannot be viewed by or is not visible to customers. Another disadvantage is that CDs, DVDs, software disks and the like typically cannot be easily inserted, whether by hand or by automated equipment, into the pocket. Such display packaging is also preferably provided with additional packaging when shipped to avoid damage to its contents during shipping. Moreover, prior art display packaging does not allow software manuals and other bulkier items to be shipped with the CD, DVD, software disks and the like.

In addition, jewel cases and prior art display packaging typically require unduly complex automated processes for their assembly or to insert the CD, DVD, software disk and the like therein. DVD cases and software boxes typically require hand assembly because they are usually constructed from multiple pieces and/or are of such a design that the DVDs or disks, manuals and other packaging material cannot be easily or automatically inserted in the package.

What is desired, therefore, is a packaging system for CDs, DVDs, software and the like that takes up relatively little retail shelf space, is relatively light weight and durable, yet which allows information concerning the contents of the system to be viewed when the system is displayed on retail shelf space or is otherwise stored. What is also desired is a packaging system that is relatively small, light weight and durable, yet which provides added protection during shipping. What is still further desired is a packaging system that is relatively small, light weight and durable, yet which can be relatively easily assembled using relatively simple automated assembly equipment. Further desired is a packaging system that is relatively small, light weight and durable, yet one in which bulky items, such as software manuals and the like, can be packaged. None of which features are found in the prior art packaging disclosed in the '063, the '311 and the '977 patents.

SUMMARY OF THE INVENTION

Accordingly, an object of the invention is to provide a packaging system which takes up relatively little retail shelf space, yet which is durable and allows information to be displayed thereon when the packaging system is stored on a retail shelf.

Another object of the invention to provide a packaging system which takes up relatively little retail shelf space, is relatively small and light weight, yet is durable, and provides added protection during shipping.

A further object of the invention is to provide a packaging system which takes up relatively little retail shelf space, is relatively small and light weight, yet is durable, and allows for relatively easy assembly using relatively simple automated assembly equipment.

Yet a further object of the invention is to provide a packaging system which takes up relatively little retail shelf space, is relatively small and light weight, yet is durable, and allows bulky manuals and the like to be packaged with the CDs, DVDs, software disks and the like packaged therein.

Other objects of the invention will be obvious and may in part appear hereinafter.

These and other objects, features and advantages of the invention are achieved by providing a packaging system for CDs, DVDs, software disks and the like including a base having upper and lower panels with outer and inner ends, the inner ends having central portions. The panels are hingedly connected together along their respective outer and inner ends. The central portions of the inner ends are spaced apart from each other to define an elongate slot. The packaging system also includes an upright body connected to the base and extending upwardly therefrom through the slot. The body comprises a plurality of opposing panels which defines a pocket with an edge. At least one of the opposing panels of the upright body has an elongate vertical edge portion arranged relative to the slot such that the upright body is capable of being maintained upright relative to the base so that the media item is displayed. The pocket edge has an upper opening which generally has a shape such that the media item is held therein, a lower opening with a nonlinear shape, and opposing ends which terminate in holes. At least one of the plurality of opposing panels of the upright body has an elongate vertical edge portion of considerable extent arranged in outwardly and downwardly diverging relation to the slot so as to provide progressively increasing frictional engagement with proximal end portions of the slot, which maintains the packaging system in a display position. The system further comprises an elongate member connected to the base with a construction such that the elongate member is capable of enfolding the base and a face which provides added stiffness and durability.

Preferably, the elongate member is comprised of at least two panels and a spine hingedly connected between the panels such that it is adjacent to the inner ends of the base when the base is collapsed. It is advantageous for the upright body portion to have more than one pocket and/or the elongate member to have one or more pockets to receive and retain more than one CD, DVD, software disk and/or the like. It is also advantageous for the elongate member to have a pouch hingedly connected to it for holding bulky items within the packaging system.

The invention and its particular features will become more apparent from the following detailed description considered with reference to the accompanying drawings.

BRIEF DESCRIPTION OF THE DRAWINGS

FIG. 4A is a plan view of a blank used to form the embodiment shown in FIG. 1;

FIG. 4B is a perspective view of the blank shown in FIG. 4A being assembled;

FIG. 4C is a perspective view of the assembly shown in FIG. 4B being further assembled;

FIG. 4D is a perspective view of the assembly shown in FIG. 4C being still further assembled;

FIG. 6A is a plan view of a blank used to form the embodiment shown in FIGS. 5A and 5B;

FIG. 6B is a perspective view of the blank shown in FIG. 6A being assembled;

FIG. 6C is a perspective view of the assembly shown in FIG. 6B being further assembled;

FIG. 6D is a perspective view of the assembly shown in FIG. 6C being still further assembled;

FIG. 9 is a plan view of a blank used to form the embodiment shown in FIG. 8;

FIG. 10 is a plan view of a blank used to form the embodiment shown in FIG. 11; and FIG. 11 is a perspective view of another embodiment of the packaging system in a display position.

DETAILED DESCRIPTION

Figure 1:
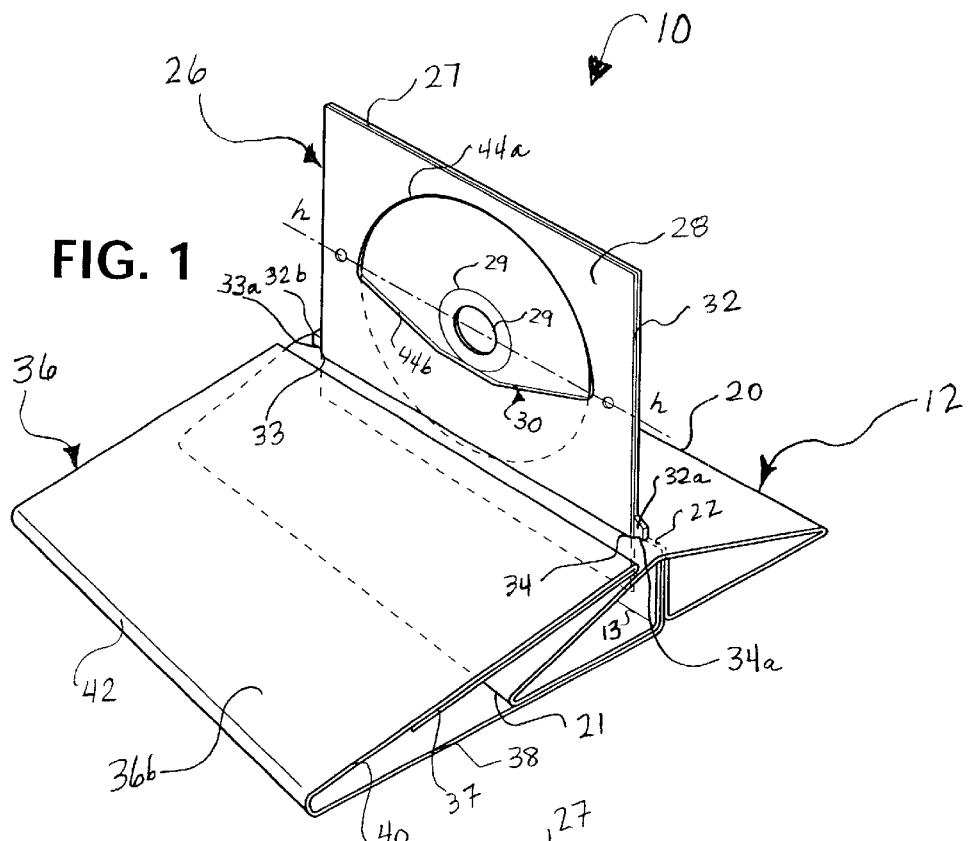
FIG. 1 is a perspective view of an embodiment of the packaging system in display position.
Figure 2:
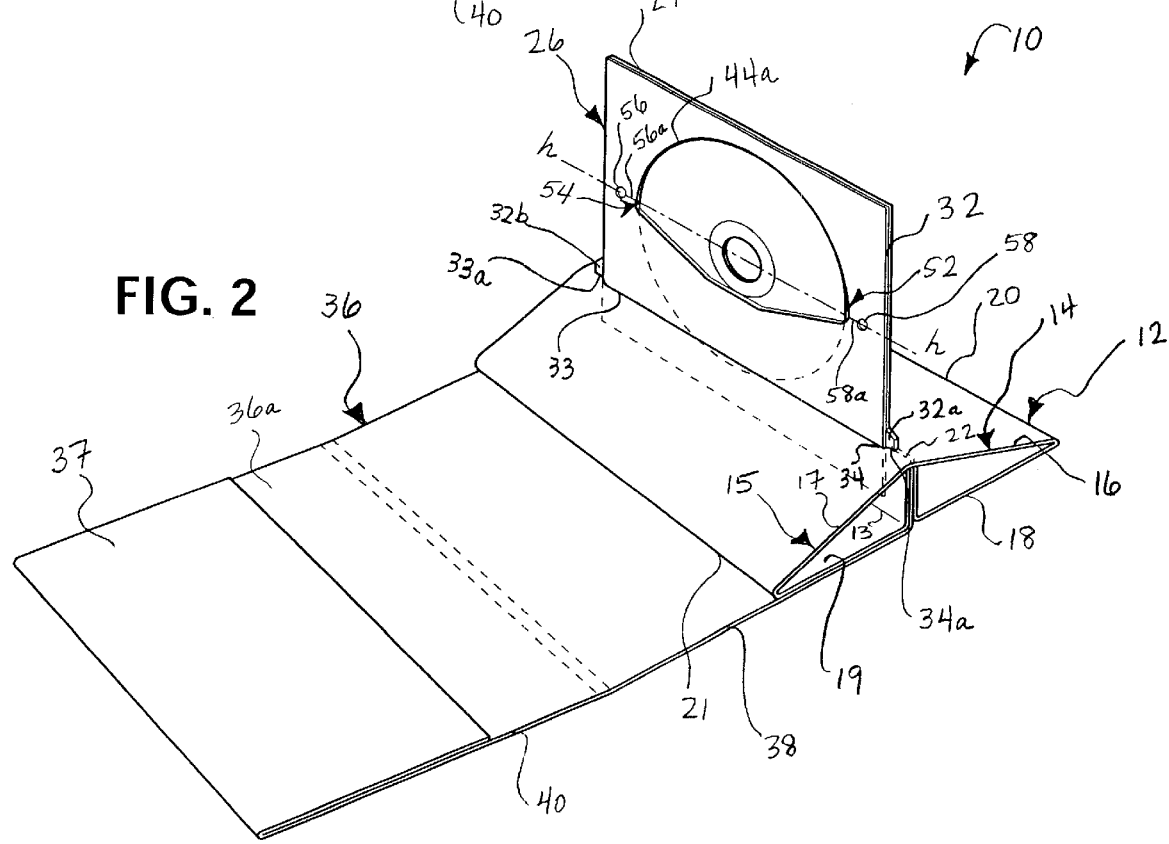
FIG. 2 is another perspective view of the embodiment shown in FIG. 1 in another display position.
Figure 3A:
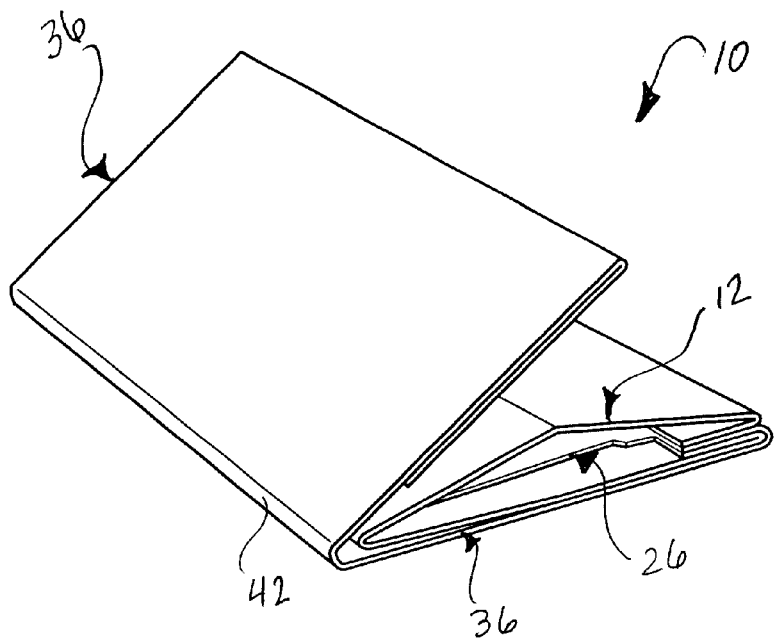
FIG. 3A is a perspective view of the embodiment shown in FIG. 1 in an enfolded and collapsed position.
Figure 3B:
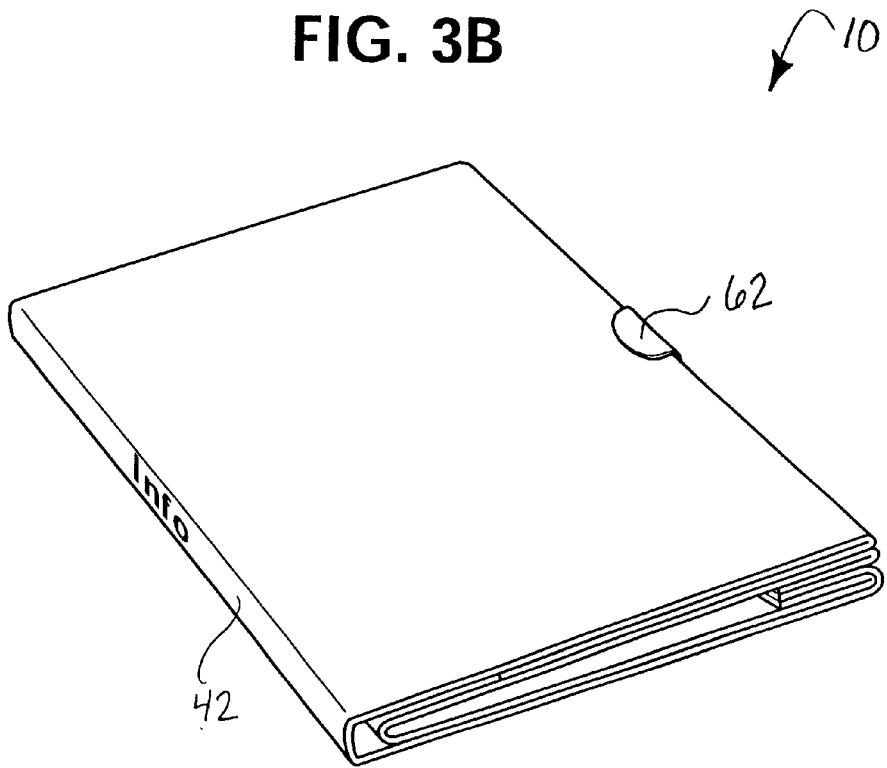
FIG. 3B is a perspective view of the embodiment shown in FIG. 1 in its completely enfolded and collapsed position.

FIGS. 1–2, 3A–B, and 4A–D depict a packaging system 10 including a base 12, an upright body 26 that holds CDs, DVDs, software and the like and is connected to base 12 at foldline 13, and an elongate member 36. Base 12 and upright body 26 are constructed such that they communicate with each other to provide packaging system 10 with a collapsed position and display positions. Elongate member 36 cooperates with base 12 and upright body 26 such that it enfolds base 12 when it is collapsed and extends or folds so as to allow advertising information on the outside or the inside of elongate member 36, whichever is desired, to be viewed. The collapsed position of base 12 and an enfolded position of elongate member 36 are shown in FIGS. 3A and 3B. Display positions are shown in FIGS. 1 and 2.

CDs, DVDs, software disks and the like are referred to collectively herein as "a media item." "Media item" also may include, for example, 35mm photos, photo-CDs, software pamphlets, booklets, credit cards, computer cards/chips and other planar items. "Media item" shall also be understood to include plural forms of the phrase.

Base 12 has opposing halves 14, 15 which are each formed from a pair of spaced apart upper 16, 17 and lower 18, 19 panels. The upper and lower panels 16, 17, 18 and 19 are hingedly connected together along their inner ends 22, and their outer ends 20, 21. The inner ends 22 are spaced apart from each other in their central portion to define an elongate slot 24 therebetween.

Upright body 26 is connected to base 12 such that it is capable of extending upwardly from base 12 and through slot 24. Body 26 includes a plurality of opposing panels 28 which define at least one pocket 30. Pocket 30 is adapted so that it can relatively easily receive media items. At least one of opposing panels 28 has an elongate vertical edge portion 32 having a considerable length and being arranged such that it extends outwardly and downwardly in diverging relation to slot 24. Elongate vertical edge portion 32 is constructed such that it communicates with slot 24 in progressively increasingly frictional engagement with proximal end portions 33 and 34 of slot 24. This increasing frictional engagement with slot 24 by proximal end portions 33 and 34 maintains packaging system 10 in a display position. Elongate vertical edge portion 32 may have shoulders 32a and 32b, for example as shown in FIGS. 1 and 2, which engage end portions 33 and 34 and maintain packaging system 10 in a display position.

Elongate member 36 is connected to base 12. Elongate member 36 is preferably connected to base 12 between the opposing halves 14, 15 at foldline 13. Elongate member 36 has at least two panels 38, 40 which are hingedly connected to each other and of such a length that elongate member 36 is capable of enfolding base 12 when base 12 is collapsed, as shown in FIGS. 3A and 3B. Elongate member 36 preferably has a spine 42, as defined above, which allows information to be displayed thereon while packaging system 10 is stored. For example, spine 42 allows information printed thereon to be visible by a customer or other individual when packaging system 10 is stored on a retail shelf, or in a CD rack.

Elongate member 36 further has face 37, as shown in FIG. 2, which provides added protection during shipping. Preferably face 37 extends to spine 42 (not shown) to impart added strength and durability to elongate member 36.

Elongate member 36 may also be provided with printed information, such as advertising. This printed information may appear on the inside 36a or outside 36b of elongate member 36. Printed information on the outside 36b of elongate member 36 may be viewed when packaging system 10 is in the display position shown in FIG. 1 or in enfolded positions shown in FIGS. 3A and B. Printed information on the inside 36a of elongate member 36 may be viewed when packaging system 10 is in the display position shown in FIG. 2, for example.

Pocket 30 has an edge 44 that defines upper and lower openings 44a and 44b respectively, as depicted in FIGS. 1 and 2. Upper and lower openings 44a and 44b are generally defined by horizontal reference line h; upper opening 44a comprises pocket edge 44 lying above reference line h and lower opening 44b comprises pocket edge 44 below reference line h. Reference line h may, but is not required to, bisect the media item placed in pocket 30. Upper opening 44a generally conforms to the shape of the media item to be held in pocket 30. For example, as shown in FIGS. 1 and 2, upper opening 44a is semicircular and generally sized so as to conform to the upper portion of a CD, DVD, or software disk placed therein. By way of further example, for a generally rectangular media item, upper opening 44a may be generally rectangular so as to conform to the perimeter of the media item projecting above horizontal reference line h. Upper opening 44a tends to hold the media item in pocket 30 and prevent it from falling out, if packaging system 10 is turned on its end 27.

Pocket 30 has an edge 44 that defines upper and lower openings 44a and 44b respectively, as depicted in FIGS. 1 and 2. Upper and lower openings 44a and 44b are generally defined by horizontal reference line h; upper opening 44a comprises pocket edge 44 lying above reference line h and lower opening 44b comprises pocket edge 44 below reference line h. Reference line h may, but is not required to, bisect the media item placed in pocket 30. Upper opening 44a generally conforms to the shape of the media item to be held in pocket 30. For example, as shown in FIGS. 1 and 2, upper opening 44a is semicircular and generally sized so as to conform to the upper portion of a CD, DVD, or software disk placed therein. By way of further example, for a generally rectangular media item, upper opening 44a may be generally rectangular so as to conform to the perimeter of the media item projecting above horizontal reference line h. Upper opening 44a tends to hold the media item in pocket 30 and prevent it from falling out, if packaging system 10 is turned on its end 27. FIGS. 8–11 show curvedly-shaped lower openings 44b″ and 44b‴ corresponding to openings 44b and 44b′, respectively, for the embodiments of the invention shown in FIGS. 1, 4A, 6A and 5A.

Pocket edge 44 also has opposing ends 52 and 54. Opposing ends 52 and 54 may have small holes 56 and 58 adjacent thereto. As shown in FIGS. 1, 2, 4A and 4B, opposing ends 52 and 54 may but are not required to terminate in perforations 56a and 58a disposed between edge 44 and holes 56 and 58, respectively. Opposing ends 52 and 54, small holes 56 and 58 and/or perforations 56a and 58a may lie along horizontal reference line h, but are not required to. Small holes 56 and 58 and perforations 56a and 58a, alone and/or together, provide for even easier insertion of a media item into pocket 30 by allowing pocket 30 to expand even wider than a pocket not having holes 56 and 58 and/or perforations 56a and 58a, while still adequately holding the media item after it has been inserted. Holes 56 and 58, perforations 56a and 58a, and lower opening 44b are also advantageous because they generally allow thicker and/or multiple CDs, DVDs, software disks and the like to be inserted in pocket 30.

The plurality of opposing panels 28 that form pocket 30 may have one or more embossments 29, for example, to conform to the side of a media item placed in pocket 30. This allows the media item to be more snugly held within pocket 30.

Figure 5A:
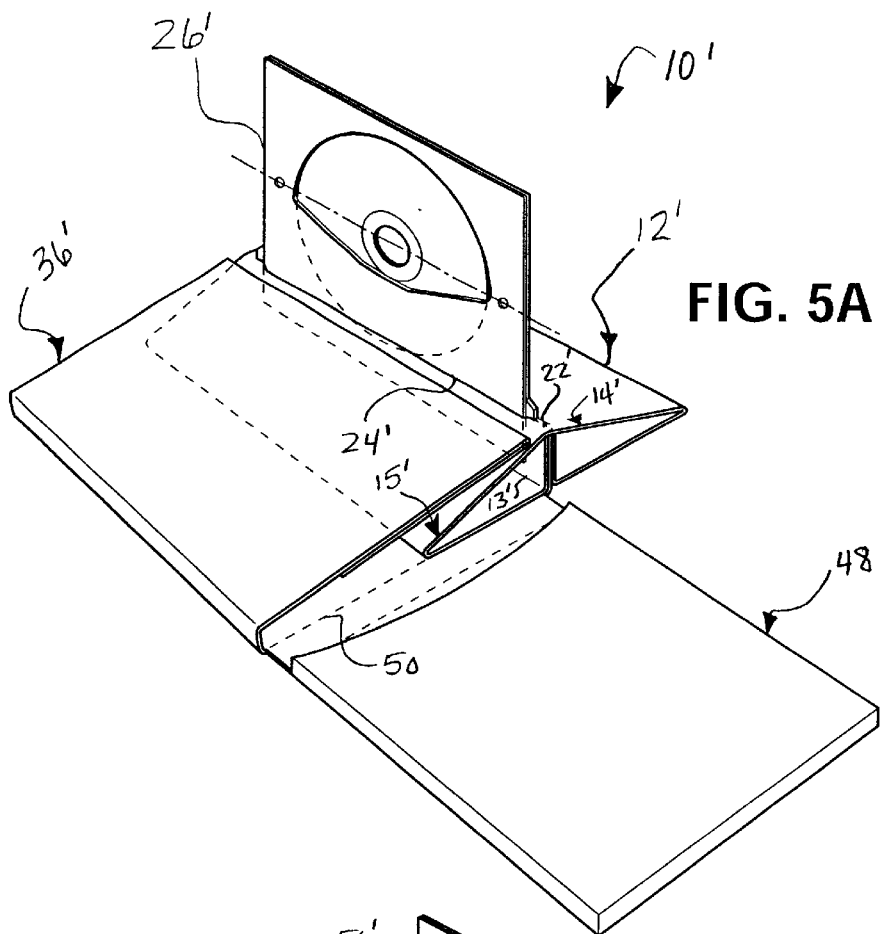
FIG. 5A is a perspective view of another embodiment of the packaging system in a display position.
Figure 5B:
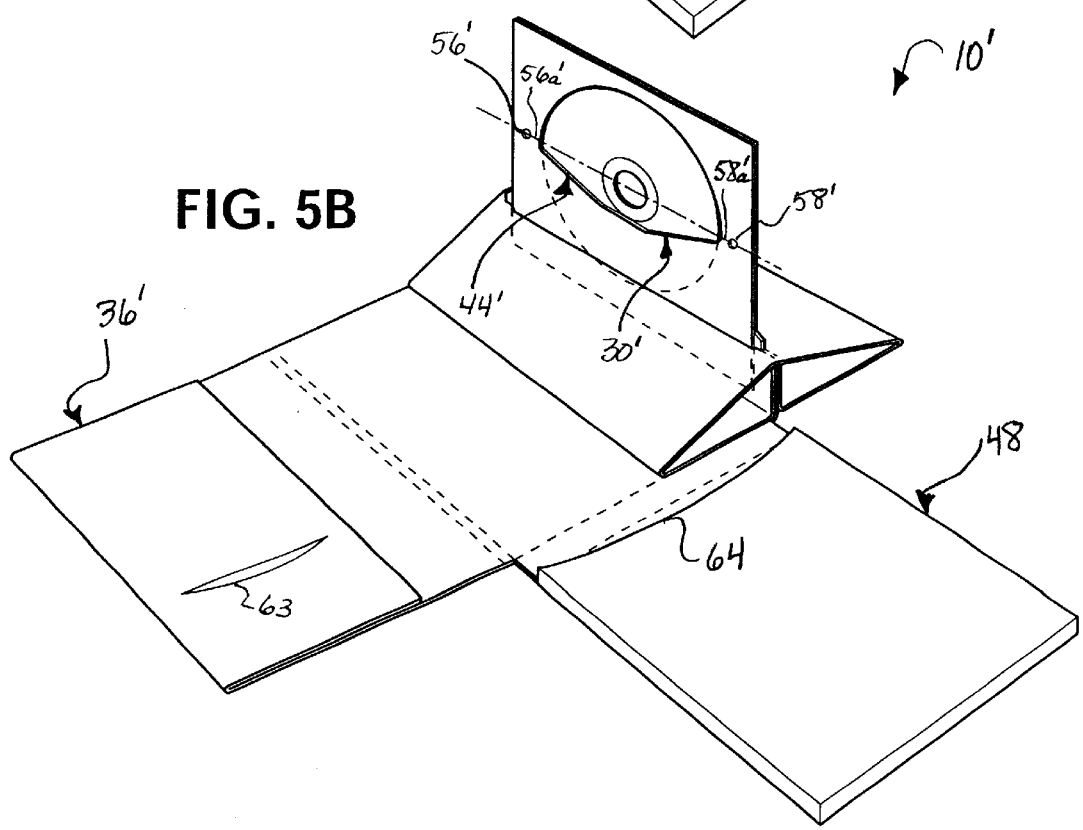
FIG. 5B is a perspective view of the embodiment shown in FIG. 5A in another display position.
Figure 6E:
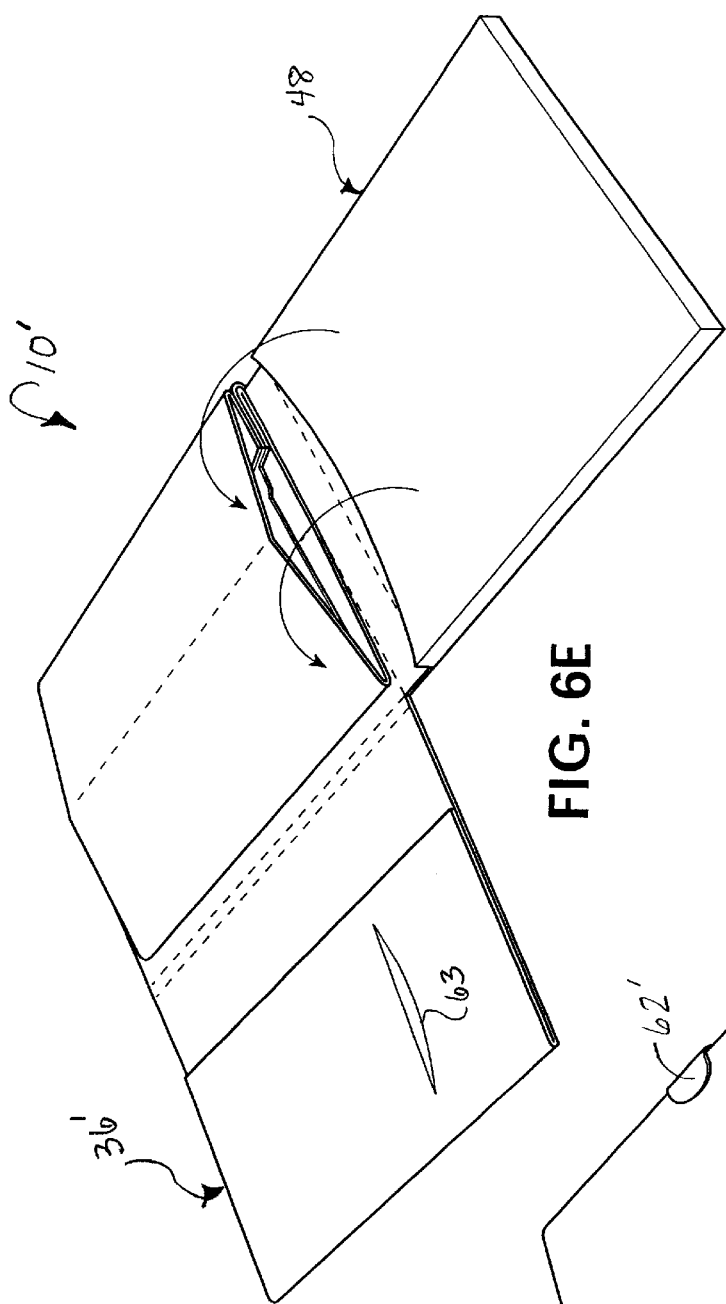
FIG. 6E is a perspective view of the assembly shown in FIG. 6D being folded.

Packaging system 10' is also provided as shown in FIGS. 5A–B, 6A–E and 7. Packaging system 10' generally has the features and functions described above relative to packaging system 10, but also includes pouch 48 for holding bulky items, such as one or more software manuals, promotional items or generally nonplanar items. Pouch 48 has a size such that it can hold such bulky items. Pouch 48 is connected to packaging system 10' so that it is capable of folding over base 12' when base 12' is in its collapsed position, as shown in FIG. 6E. Preferably, pouch 48 is hingedly connected to elongate member 36'. Elongate member 36' has elongate side 50 which is generally in a plane that is transverse to the plane in which upright body 26' lies. Pouch 48 preferably is connected to elongate side 50. This configuration allows pouch 48 to clear base 12' when it is folded over base 12'.

It is understood that pouch 48 may be connected to elongate member 36' at another edge or it may be connect directly to base 12'. Connecting pouch 48 directly to one end 66 of elongate member forming portion E' is referred to as being connected "in-line." Connecting pouch 48 in-line is generally preferable as it makes assembly of packaging system 10' easier, but would require the addition of one or more panels to blank 46'.

Packaging system 10', as a result of pouch 48, has a wall 60 adjacent to elongate side 50 or base 12', depending upon which it is connected to. Wall 60 may also have information displayed thereon, in addition to information displayed on spine 42'.

Packaging systems 10 and 10' may be held closed with seal 62, 62'. Seal 62, 62' can be any suitable sealing material, including a plastic tab, wafer seal or velcro. A wafer seal having a half moon shape in shown in FIGS. 3B and 7. Multiple seals may also be used, as appropriate.

Packaging systems 10 and 10' may be shrink wrapped. The shrink wrap encases the packaging systems 10 and 10' and protects them during shipment and handling. Typical shrink wrap is plastic and provides a moisture and/or vapor barrier against the elements. It is desirable for the wrap to be transparent or at least translucent so that the packaging systems 10 and 10' can be easily seen. The shrink wrap may be printed thereon or otherwise decoratively treated.

Packaging systems 10 and 10' may be formed from blanks 46 and 46', respectively, as shown in FIGS. 4A–D and 6A–E. FIG. 6E specifically shows that base 12' first folds over elongate member 36', and then pouch 48 folds over base 12'. Blanks 46 and 46' are generally unitary or comprised of a single piece of material, and are generally of uniform thickness. Preferably, the material is paperboard. It is understood that a different quality, color, or gauge of paperboard or alternative materials, such as plastic or a light metal alloy, or a combination thereof, may be used to make blanks 46 and 46', so long as the material used is capable of being cut and folded to form packaging systems 10 and 10'. Preferably, the paperboard has an aqueous coating. It is also understood that a coating or other surface treatment need not be used at all or may only be provided on one side of the paperboard. The paperboard may also be printed, especially on spines 42 and 42'.

As depicted in FIGS. 4A and 6A, blanks 46 and 46' have base-forming portions B and B', upright body-forming portions U and U', and elongate member-forming portions E and E', respectively. Blank 46' also has pouch-forming portion P. Upright body-forming portions U and U' form pockets 30 and 30', with edges 44 and 44', respectively. Slots 24 and 24' are also shown in FIGS. 4A and 6A. FIGS. 5B and 6A–E further show edge 64 of pouch, and ancillary pocket opening 63. It is understood that, while pouch edge 64 and ancillary pocket opening 63 are shown having the shapes in FIGS. 5B and 6A–B, they can have any shape. Portions B, B', U, U', E and E' are formed from a plurality of serially arranged panels with hinged connections therebetween so as to correspond to panels and features described above relative to packaging systems 10 and 10'. The panels generally have rectangular configurations, but can have any configurations, including trapezoidal configurations. Hinged connections described herein are understood to include those formed by creasing, partially cutting, perforating or scoring the paperboard. Outer edges of blanks 46 and 46', slots 24 and 24', holes 56, 58, 56' and 58' and perforations 56a, 58a, 56a' and 58a' and any other slits desired may be die cut using a rule die or other die known to those of ordinary skill in the art.

Desirably blanks 46 and 46' are automatically assembled. Blanks 46 and 46' are assembled to form packaging systems 10 and 10' by glueing. Any type of glue may be used but preferably glue which may be used in automatic assembly equipment is used. Media items may also desirably be automatically inserted. By comparing FIGS. 4A–D and 6A–E, it can be seen how to glue and assemble packaging systems 10 and 10'. U.S. Pat. Nos. 5,641,063, 5,613,311 and 5,608,977 describe in detail methods for glueing and assembling display packaging within the level of ordinary skill in the art which can be used to glue and assemble blanks 46 and 46'. U.S. Pat. Nos. 5,641,063, 5,613,311 and 5,608,977 are hereby incorporated by reference.

Figure 7:
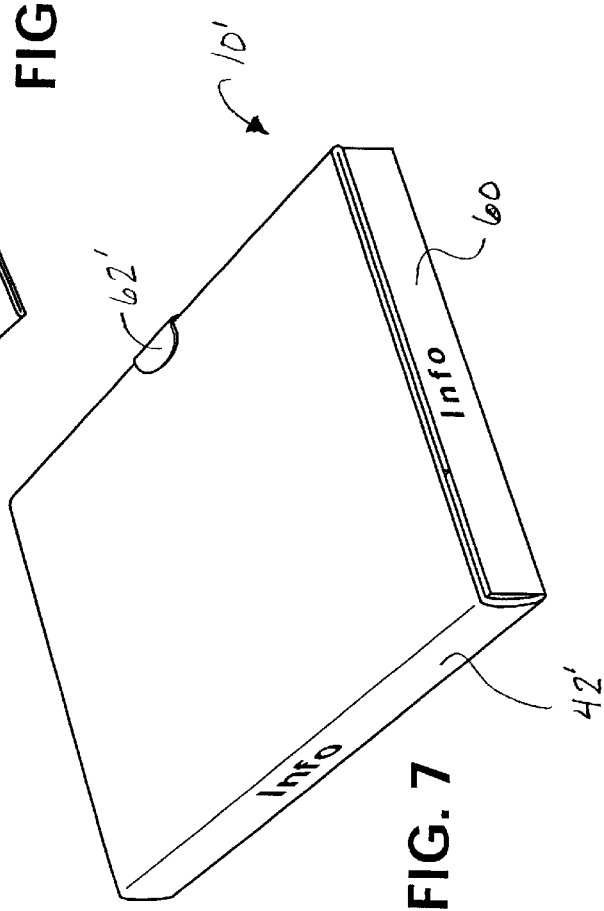
FIG. 7 is a perspective view of the embodiment shown in FIG. 5 in its completely enfolded and collapsed position.
Figure 8:
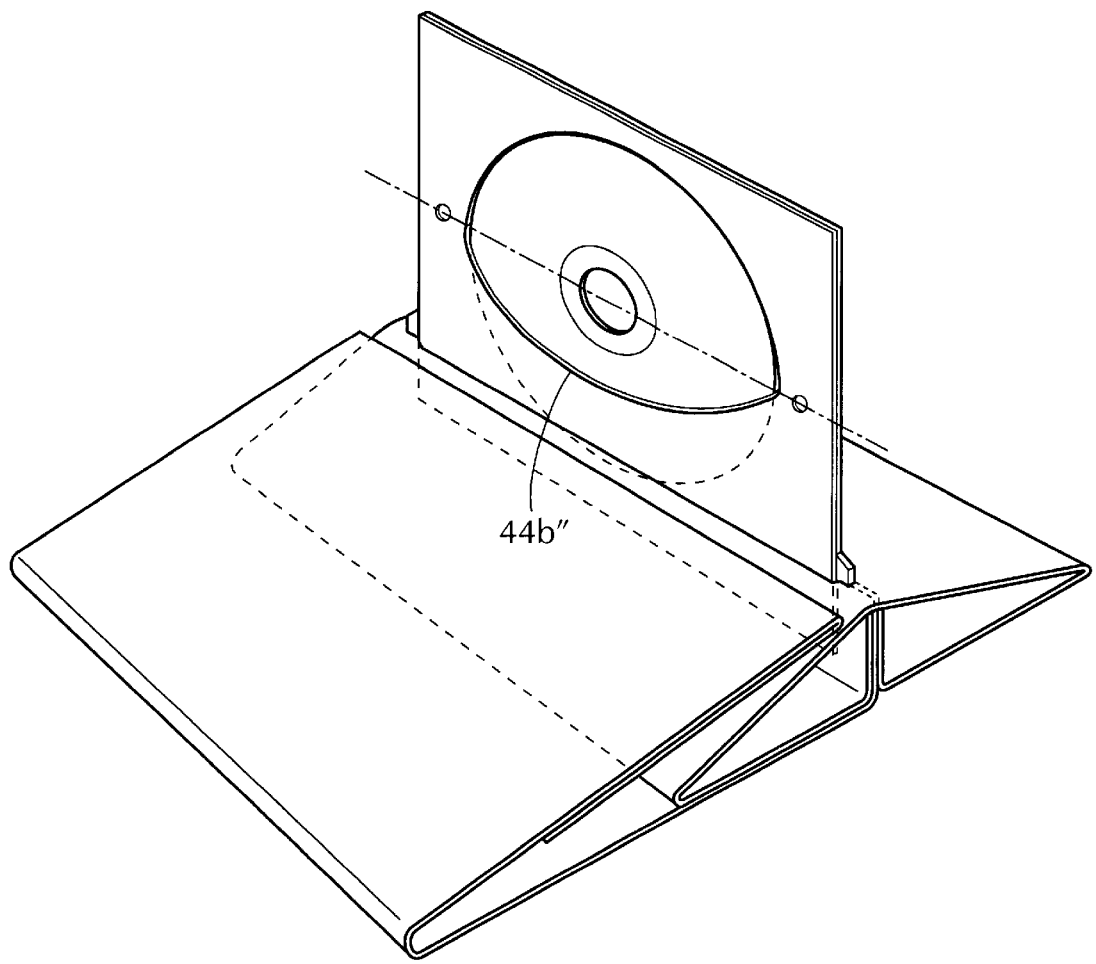
FIG. 8 is a perspective view of another embodiment of the packaging system in a display position.

FIGS. 1–3B show how to display and enfold packaging system 10 in preparation for shipping and/or storing. FIGS. 5A, 5B and 7 similarly show how to display and enfold packaging system 10'. To display the media item, upright bodies 26 and 26' extend upwardly from bases 12 and 12' through elongate slots 24 and 24'. To enfold packaging systems 10 and 10', base halves 14, 14', 15, and 15' are collapsed along foldlines 13 and 13' such that upright bodies 26 and 26' are substantially covered by bases 12 and 12', and elongate members 36 and 36' are enfolded around collapsed bases 12 and 12'. This ability of packaging systems 10 and 10' to move from a display position to a collapsed and enfolded position is provided by hingedly connecting elongate members 36 and 36' and upright bodies 26 and 26' to bases 12 and 12', respectively. It is understood that elongate members 36 and 36' and upright bodies 26 and 26' are integrally connected to bases 12 and 12'.

As shown in FIGS. 1, 2, 5A and 5B, upright bodies 26 and 26' communicate and interfere with elongate slots 24 and 24' so that packaging systems 10 and 10' are capable of remaining in a display position. This can be achieved, for example, by providing elongate slots 24 and 24' with slits 33a and 34a at end portions 33 and 34, along inner ends of spaced apart upper and lower panels 22 and 22', and by providing bases 12 and 12' with shoulders 32a and 32b which correspond to the slits 33a and 34a. As discussed above, this can be achieved by providing upright bodies 26 and 26' with vertical edges which increase in outwardly and downwardly diverging relation to elongate slots 24 and 24', or by providing periodic notches, lances, or steps for holding bases 12 and 12' in multiple, predetermined, intermediate positions. These and other additional features are described in U.S. Pat. Nos. 5,613,311, 5,608,977 and 5,641,063 which are incorporated by reference.

Although the invention has been described with reference to a particular arrangement of parts, features and the like, many modifications and other embodiments of the invention will be apparent to one of ordinary skill in the art having the benefit of the teachings presented in the foregoing descriptions and the associated drawings. Therefore, it is understood that the invention is not limited to the specific embodiments described herein, which are exemplary, and that modifications and other embodiments are intended to be included within the scope of the claims.

What is claimed is:

1. A packaging system for media items, comprising:
    a base having upper and lower panels with outer and inner ends, the inner ends having central portions, said panels being hingedly connected together along their respective outer and inner ends, the central portions of the inner ends being spaced apart from each other to define therebetween an elongate slot;
    an upright body connected to said base and extending upwardly therefrom through the slot, said body comprising a plurality of opposing panels defining a pocket, wherein at least one of the plurality of opposing panels of said upright body has an elongate vertical edge portion arranged relative to the slot such that said upright body is capable of being maintained upright relative to said base thereby displaying the media item, the pocket having an edge, the edge having an upper opening generally with a shape such that the media item is held therein, a lower opening with a nonlinear shape, and opposing ends which terminate in holes; and
    an elongate member connected to said base having a construction such that said elongate member is capable of enfolding said base, and a face for providing added stiffness and durability.

2. The packaging system according to claim 1 wherein said elongate member further comprises a spine.

3. The packaging system according to claim 2 wherein said elongate member is comprised of at least two panels and wherein the spine is hingedly connected between the elongate member panels such that it is adjacent to the inner ends of said base when said base is collapsed, and said elongate member enfolds said base.

4. The packaging system according to claim 3 made from a blank.

5. The packaging system according to claim 3 further comprising a pouch connected to said elongate member such that said pouch is capable of folding over said base.

6. The packaging system according to claim 5 wherein said elongate member has an elongate side and said pouch is connected to said elongate side.

7. The packaging system according to claim 1 wherein the lower pocket opening has a shape formed from a plurality of linear segments, or is curved.

8. A packaging system for media items, comprising:
   a base having upper and lower panels with outer and inner ends, the inner ends having central portions, said panels being hingedly connected together along their respective outer and inner ends, the central portions being spaced apart from each other to define therebetween an elongate slot;
   an upright body connected to said base and extending upwardly therefrom through the slot, said body comprising a plurality of opposing panels defining a pocket adapted to receive and hold the media item therein, wherein at least one of the plurality of opposing panels of said upright body has an elongate vertical edge portion arranged relative to the slot such that said upright body is capable of being maintained upright relative to said base thereby displaying the media item; and
   an elongate member connected to said base having at least two panels hingedly connected to each other, a face for providing added stiffness and durability, and a length such that said elongate member is capable of enfolding said base.

9. The packaging system according to claim 8 wherein said elongate member further comprises a spine hingedly connected to the elongate member panels such that said spine is adjacent to the inner ends of said base when said base is collapsed, and said elongate member enfolds said base.

10. The packaging system according to claim 9 wherein the pocket has an edge with upper and lower openings, the lower opening having a shape that is nonlinear.

11. The packaging system according to claim 10 wherein the lower pocket opening has a shape formed from a plurality of linear segments, or is curved.

12. The packaging system according to claim 9 made from a blank.

13. The packaging system according to claim 9 further comprising a pouch connected to said elongate member such that said pouch is capable of folding over said base.

14. The packaging system according to claim 13 wherein said elongate member has an elongate side and said pouch is connected to said elongate side.

15. A packaging system for media items, comprising:
   a base having upper and lower panels with outer and inner ends, the upper panel inner ends having central portions, said panels being hingedly connected together along their respective outer and inner ends, the central portions of the inner ends being spaced apart from each other to define therebetween an elongate slot;
   an upright body connected to said base and extending upwardly therefrom through the slot, said body comprising a plurality of opposing panels defining a pocket, wherein the pocket has an edge with an upper opening generally in a shape such that the media item is held therein and a lower opening with a nonlinear shape; and
   an elongate member connected to said base having a construction such that said elongate member is capable of enfolding said base, and a face for providing added stiffness and durability.

16. The packaging system according to claim 15 wherein said elongate member further comprises a spine.

17. The packaging system according to claim 16 wherein said elongate member is comprised of at least two panels and wherein the spine is hingedly connected between the elongate member panels such that it is adjacent to the inner ends of said base when said base is collapsed, and said elongate member enfolds said base.

18. The packaging system according to claim 17 made from a blank.

19. The packaging system according to claim 17 further comprising a pouch connected to said elongate member such that said pouch is capable of folding over said base.

20. The packaging system according to claim 19 wherein said elongate member has an elongate side and said pouch is connected to said elongate side.

21. The packaging system according to claim 15 wherein the lower pocket opening has a shape formed from a plurality of linear segments, or is curved.

22. A packaging system for media items, comprising:
   a base having upper and lower panels with outer and inner ends, the upper panel inner ends having central portions, said panels being hingedly connected together along their respective outer and inner ends, the central portions being spaced apart from each other to define therebetween an elongate slot;
   an upright body connected to said base and extending upwardly therefrom through the slot, said body comprising a plurality of opposing panels defining a pocket adapted to receive and hold the media item therein; and
   an elongate member connected to said base having at least two panels hingedly connected to each other, a face for providing added stiffness and durability, and a length such that said elongate member is capable of enfolding said base.

23. The packaging system according to claim 22 wherein said elongate member further comprises a spine hingedly connected to the elongate member panels such that said spine is adjacent to the inner ends of said base when said base is collapsed, and said elongate member enfolds said base.

24. The packaging system according to claim 23 wherein the pocket has an edge with upper and lower openings, the lower opening having a shape that is nonlinear.

25. The packaging system according to claim 24 wherein the lower pocket opening has a shape formed from a plurality of linear segments, or is curved.

26. The packaging system according to claim 23 made from a blank.

27. The packaging system according to claim 23 further comprising a pouch connected to said elongate member such that said pouch is capable of folding over said base.

28. The packaging system according to claim 27 wherein said elongate member has an elongate side and said pouch is connected to said elongate side.

* * * * *